United States Patent
Kim

[19]

[11] Patent Number: 6,058,335
[45] Date of Patent: May 2, 2000

[54] AUTOMATED TECHNIQUE FOR MANUFACTURING HARD DISK DRIVE

[75] Inventor: Sang-Ho Kim, Gumi, Rep. of Korea

[73] Assignee: SamSung Electronics Co., Ltd., Suwon, Rep. of Korea

[21] Appl. No.: 08/960,505

[22] Filed: Oct. 29, 1997

[30] Foreign Application Priority Data

Oct. 30, 1996 [KR] Rep. of Korea ............... 96-50279

[51] Int. Cl.[7] .................................................. G11B 5/596
[52] U.S. Cl. .................... 700/108; 700/56; 360/77.05
[58] Field of Search ................ 468/15; 360/75, 360/31, 77.05; 700/108, 56

[56] References Cited

U.S. PATENT DOCUMENTS

| | | | |
|---|---|---|---|
| 4,904,938 | 2/1990 | O'Reilly et al. | 324/12 |
| 4,949,036 | 8/1990 | Bezinque et al. | 324/212 |
| 5,212,677 | 5/1993 | Shimote et al. | 369/58 |
| 5,280,395 | 1/1994 | Matsuzaki | 360/31 |
| 5,289,327 | 2/1994 | Suda | 360/109 |
| 5,333,140 | 7/1994 | Moraru et al. | 371/21.2 |
| 5,375,020 | 12/1994 | Aggarwal et al. | 360/72.1 |
| 5,382,887 | 1/1995 | Guzik et al. | 318/652 |
| 5,553,086 | 9/1996 | Sompel et al. | 371/47.1 |
| 5,589,777 | 12/1996 | Davis et al. | 324/537 |
| 5,654,841 | 8/1997 | Hobson et al. | 360/75 |
| 5,774,294 | 6/1998 | Fioravanti | 360/75 |
| 5,798,883 | 8/1998 | Kim | 360/31 |

FOREIGN PATENT DOCUMENTS

| | | |
|---|---|---|
| 5-81662 | 4/1993 | Japan . |
| 6-20236 | 1/1994 | Japan . |
| 08180 351 | 7/1996 | Japan . |

*Primary Examiner*—Emmanuel L. Moise
*Assistant Examiner*—Esaw Abraham
*Attorney, Agent, or Firm*—Robert E. Bushnell, Esq.

[57] ABSTRACT

An automation system for manufacturing a hard disk drive performs a servo writing process and a function test process at the same time, to improve a yield of a head disk assembly in the function test process. The automation system includes a function test device for performing a function test on a head disk assembly, a servo writing device for writing servo information on a disk of the head disk assembly, a control device for providing a peripheral device with a control signal for controlling a manufacturing process of the hard disk drive, and a robot device for mounting and demounting the head disk assembly to the function test device and the servo writing device under the control of the control device.

10 Claims, 6 Drawing Sheets

FIG. 1
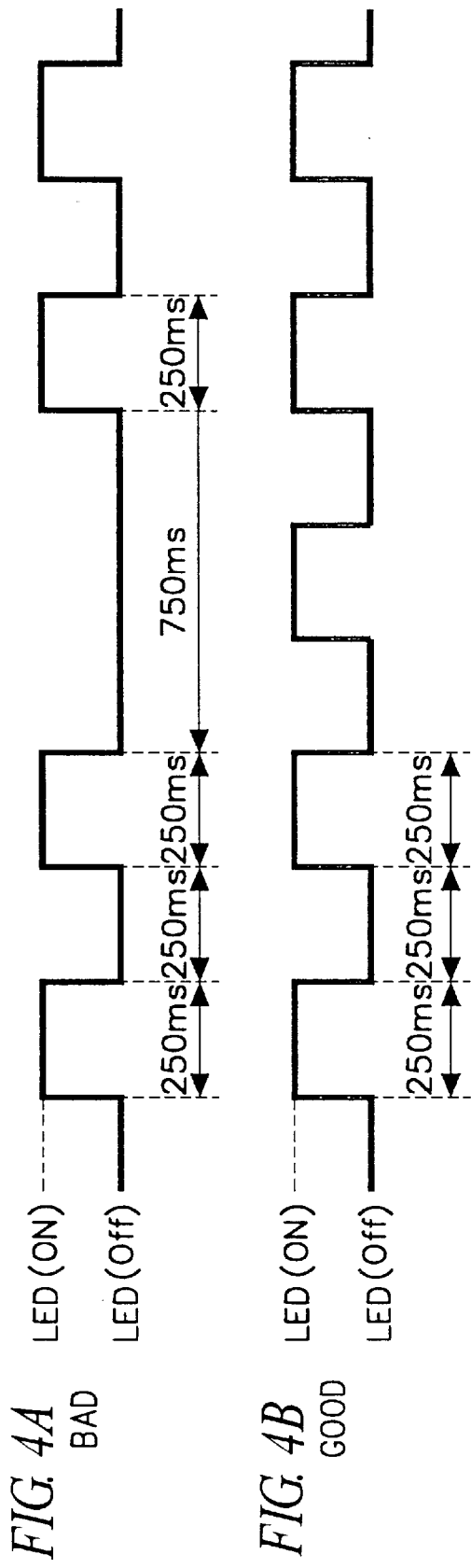
FIG. 4A BAD
FIG. 4B GOOD

AUTOMATED TECHNIQUE FOR MANUFACTURING HARD DISK DRIVE

CLAIM OF PRIORITY

This application makes reference to, incorporates the same herein, and claims all benefits accruing under 35 U.S.C. §119 from an application for AUTOMATION SYSTEM FOR MANUFACTURING HARD DISK DRIVE AND METHOD FOR OPERATING THE SAME earlier filed in the Korean Industrial Property Office on the Oct. 30$^{th}$ 1996 and there duly assigned Ser. No. 50279/1996.

BACKGROUND OF THE INVENTION

1. Field of the Invention

The present invention relates to an automated technique for manufacturing a hard disk drive, and more particularly to an automated technique for improving a yield of a head disk assembly in a function test process.

2. Description of the Related Art

A hard disk drive (HDD) which is composed of a head disk assembly and a printed circuit board can magnetically read and write a great deal of information from and onto a rotating magnetic disk, at a high speed. With the advantages of the high data storage capacity and the high operating speed, the hard disk drive has been widely used as an auxiliary memory for a computer system. Such a hard disk drive is generally manufactured by a series of divided processes.

Exemplary efforts in the art are represented by: U.S. Pat. No. 5,382,887 to Guzik et al., entitled Method And Apparatus For Compensating Positioning Error In Magnetic-Head And Magnetic-Disk Tester, U.S. Pat. No. 5,212,677 to Shimote et al., entitled Defect Inspecting Apparatus For Disc-Shaped Information Recording Media, U.S. Pat. No. 4,949,036 to Bezinque et al., entitled Disc Drive Error Mapping Using Threshold Comparison Methods, U.S. Pat. No. 5,654,841 to Hobson etal., entitled Detection Of Mechanical Defects In A Disc Drive Using Injected Test Signals, U.S. Pat. No. 5,280,395 to Matsuzaki, entitled Hard Disc Track Defect Detecting Apparatus, U.S. Pat. No. 5,289,327 to Suda, entitled Hard Disk Inspection Apparatus, U.S. Pat. No. 4,904,938 to O'Reilly et al., entitled Method And Apparatus For Testing Characteristics Of A Floppy Disc And A Floppy Disc Drive, and U.S. Pat. No. 5,589,777 to Davis et al., entitled Circuit And Method For Testing A Disk Drive Head Assembly Without Probing.

An earlier process for manufacturing the head disk assembly (HDA) of the hard disk drive is divided into first to third divided processes I, II, and III. The first divided process I is a HDA assembling process in which the head disk assembly is assembled in a clean room. The second divided process II is a servo writing process in which a servo writer writes a servo write pattern on the disk for a servo control of an actuator. Further, the third divided process III is a function test process in which the head disk assembly, being connected to a test printed circuit board assembly (PCBA), undergoes a function test for about 20 to 25 minutes, in order to check whether the head disk assembly interfaces properly with the printed circuit board assembly.

As described above, after writing the servo information on the head disk assembly, an operator must manually combine the head disk assembly with the test PCBA and apply the power thereto in order to perform the function test on the head disk assembly. In the meantime, the operator can recognize the test results by way of blinking of an indication LED.

In light of the foregoing, when performing the function test on the head disk assembly, the operator mainly depends upon a manual process. Thus, if handled improperly, the head disk assembly may be seriously damaged. Besides, the yield may be lowered in the function test process, if a pogo-pin arrangement for connecting the head disk assembly to the test PCBA is worn.

SUMMARY OF THE INVENTION

It is therefore an object of the present invention to provide an automated technique for automatically performing a servo writing process and a function test process at the same time, so as to improve a yield of a head disk assembly in the function test process.

According to an aspect of the present invention, a automation system for manufacturing a hard disk drive includes a function test device for performing a function test on a head disk assembly, a servo writing device for writing servo information on a disk of the head disk assembly, a control device for providing a peripheral device with a control signal for controlling a manufacturing process of the hard disk drive, and a robot device for mounting and demounting the head disk assembly to the function test device and the servo writing device under the control of the control device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a diagram showing an earlier process for manufacturing a head disk assembly of a hard disk drive;

FIGS. 4A and 4B are timing diagrams of test result signals from the function test system according to the present invention.

DETAILED DESCRIPTION OF THE PREFERRED EMBODIMENT

Figure 2:
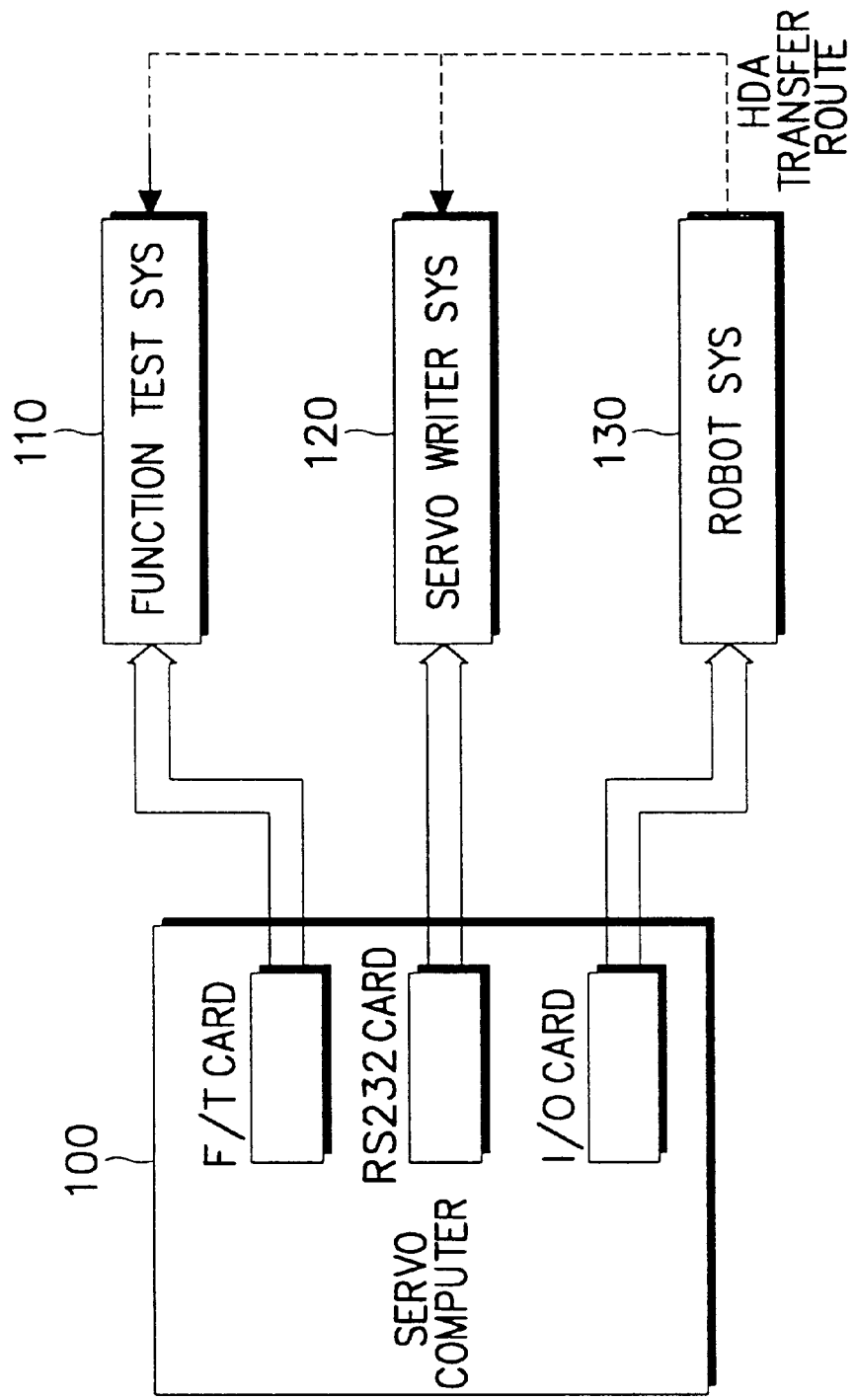
FIG. 2 is a system block diagram of an automation system for improving the yield of the head disk assembly in a function test process according to an embodiment of the present invention.

A preferred embodiment of the present invention will be described in detail hereinbelow with reference to the attached drawings, in which like reference numerals used throughout the specification represent like elements. Further, it should be clearly understood by those skilled in the art that many specifics such as the detailed circuit elements are shown only by way of example to provide a better understanding of the present invention and the present invention may be embodied without these specifics. Moreover, it should be noted that detailed descriptions on the related prior art may have been intentionally omitted if it was believed to be unnecessary in describing the concepts of the present invention.

FIG. 1 illustrates the earlier process for manufacturing a head disk assembly of a hard disk drive as noted above in the Description of the Related Art. As shown in FIG. 1, the first divided process I is an HDA assembling process while the second divided process II is the servo writing process and the third divided process III is the function test process.

Referring to FIG. 2, an automation system for manufacturing a hard disk drive according to the present invention includes a servo computer 100, a function test system 110, a servo writer system 120, and a robot system 130. The servo computer 100 provides peripheral circuits with various control signals for manufacturing the hard disk drive. The servo computer 100 includes a function test card (F/T card) for interfacing between the servo computer 100 and the function test system 110, an RS232C card for interfacing between the servo computer 100 and the servo writer system 120, and an input/output card for interfacing between the servo computer 100 and the robot system 130. The robot system 130 holds up the head disk assembly being transferred on a conveyer belt and connects it to the function test system 110 and the servo writer system 120 by way of respective connection ports, under the control of the servo computer 100. The servo writer system 120 includes a number of ports for the test printed circuit board, and writes servo information on a disk of the head disk assembly connected thereto by the robot system 130. The function test system 110 includes a number of ports for the function test, and performs a function test on the head disk assembly connected thereto by the robot system 130.

Figure 3A:
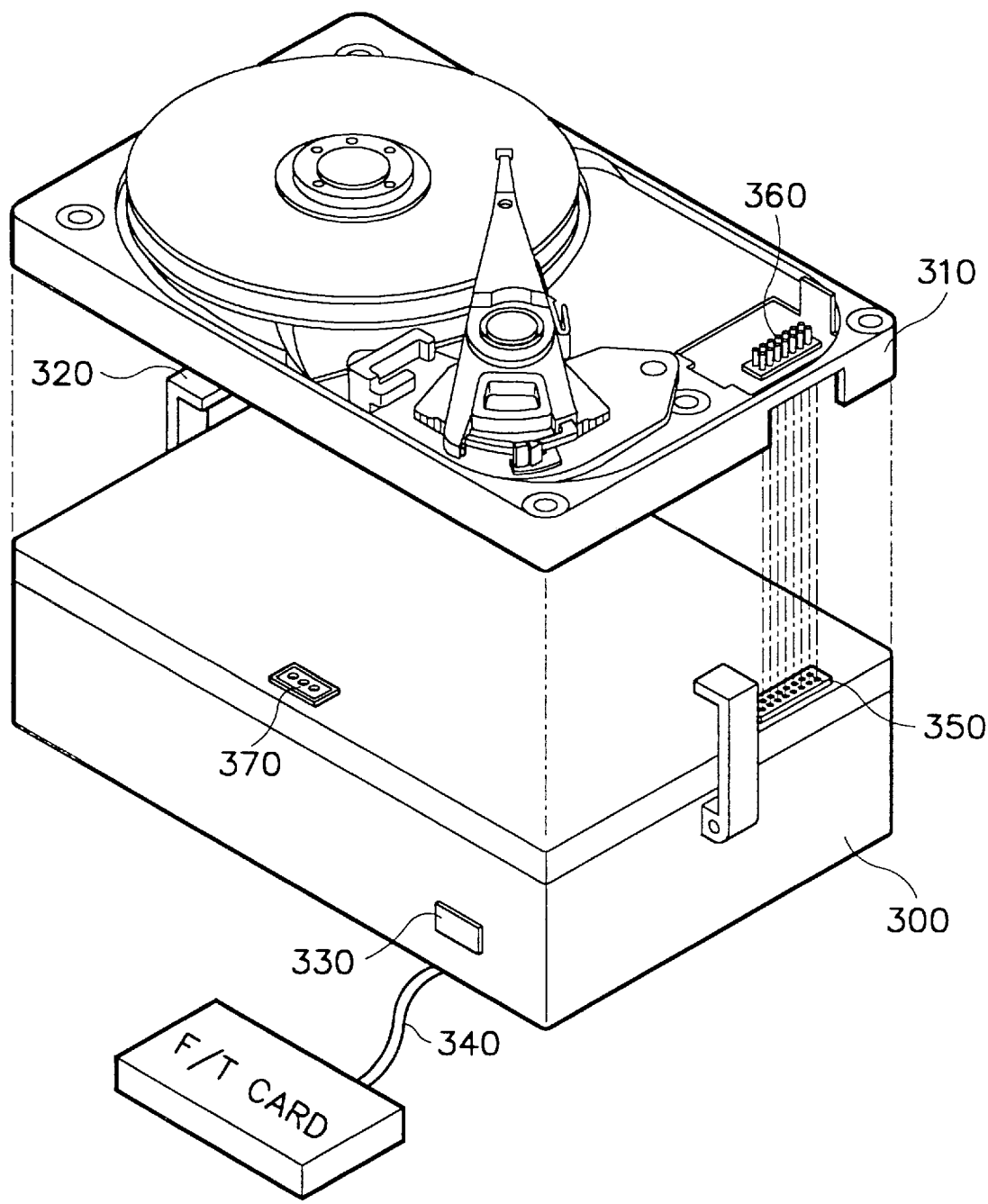
FIGS. 3A and 3B show how the head disk assembly is combined with a function test system according to the present invention.
Figure 3B:
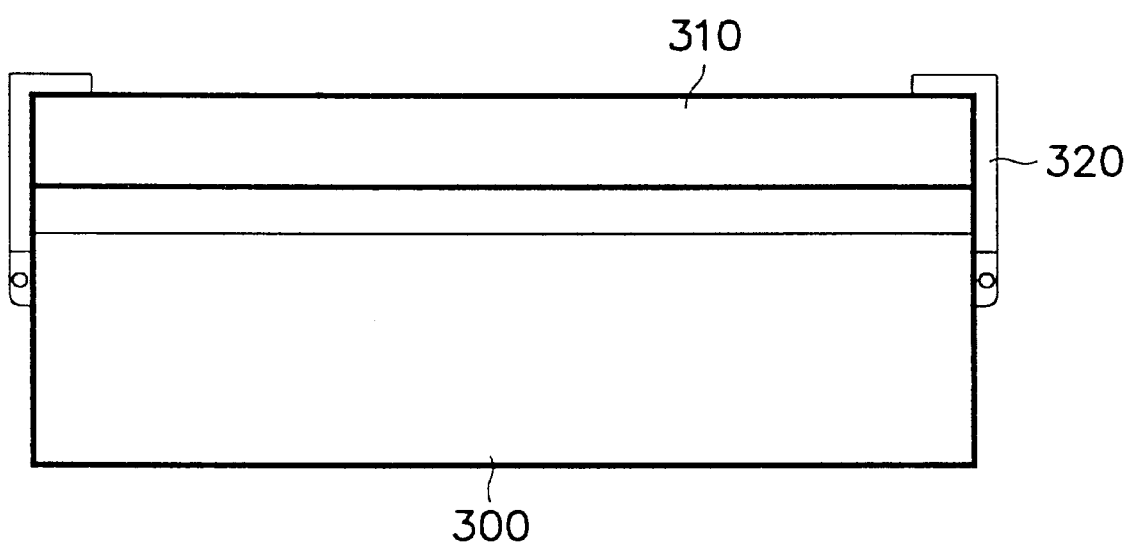
Figure 5A:
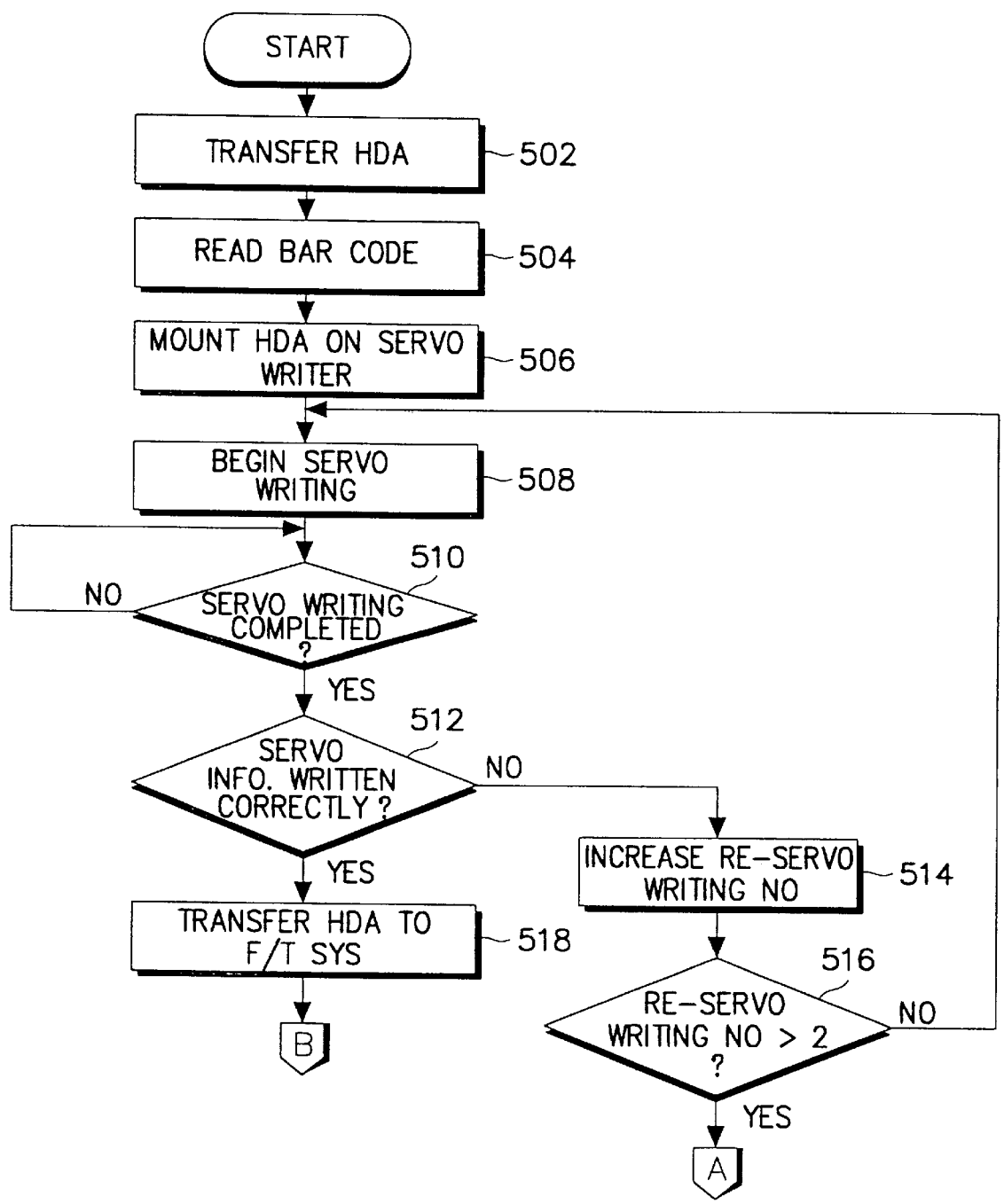
FIGS. 5A and 5B are flowcharts illustrating the controlling of the automation system according to the present invention.
Figure 5B:
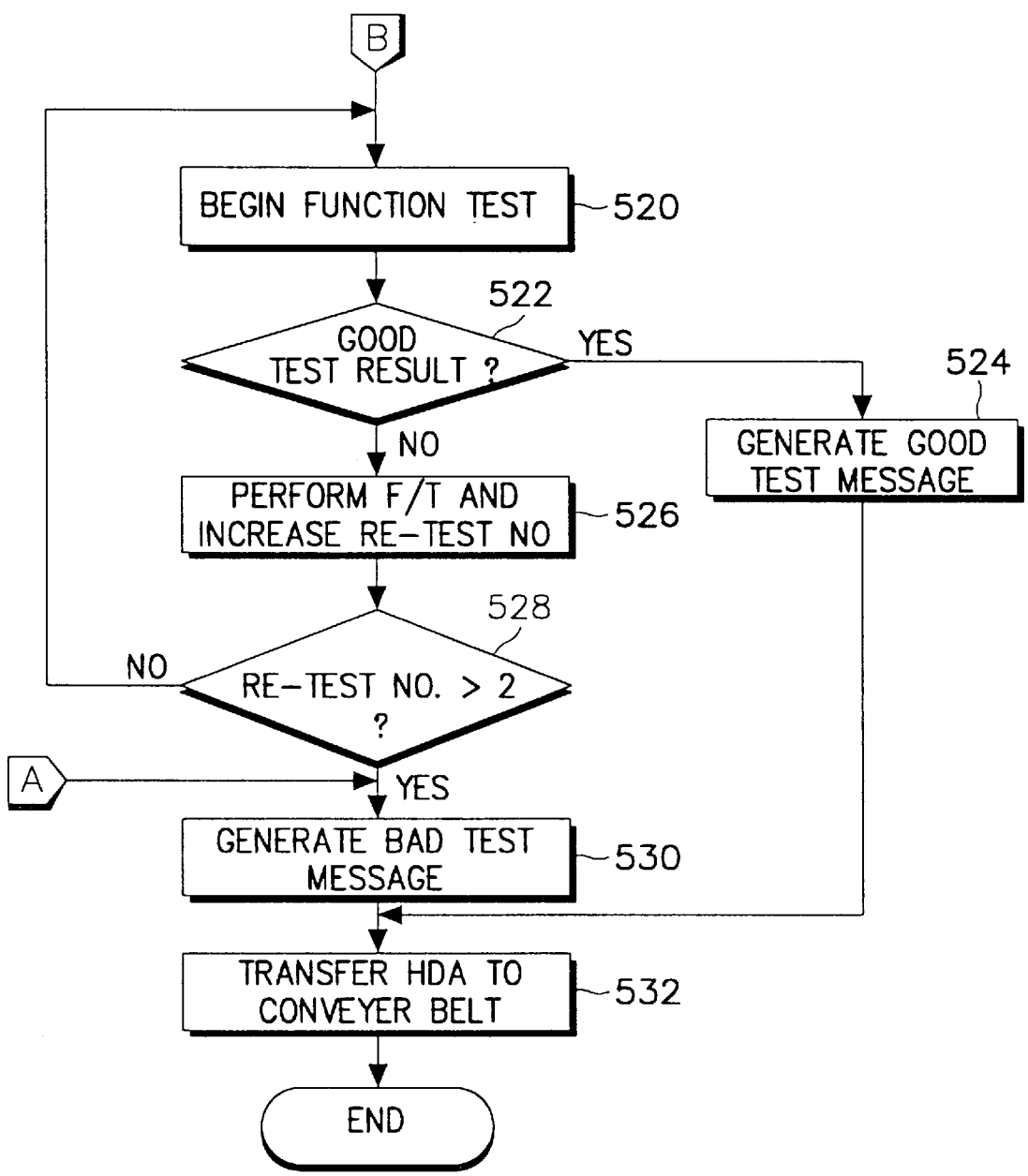

Referring to FIGS. 3A and 3B, there is shown how the head disk assembly 310 is connected to the function test system 110 via the test ports thereof. As illustrated in the drawings, jigs 320 mounted on both sides of a function test device 300 firmly fix the head disk assembly 310 on the top of the function test device 300. Pins 360 (commonly 16 pins) mounted on the head disk assembly 310 are inserted into actuator pogo-pin holes 350 connected to the printed circuit board in the function test device 300, so as to allow the function test device 300 to control an actuator of the head disk assembly 310. Spindle motor pogo-pin holes 370 connected to the printed circuit board in the function test device 300 are connected to an FPC cable (not shown) connected to a spindle motor of the head disk assembly 310, so as to allow the function test device 300 to drive the spindle motor. An LED 330 mounted on a side of the function test device 300 is connected to the function test card in the servo computer 100 to display the function test results of the head disk assembly 310. The test results are generated in accordance with, for example, the timing diagram of FIGS. 4A and 4B.

If the function test device 300 generates a good test results, the function test system 110 will continuously generate a rectangular waveform with a constant period of 500 ms as shown in FIG. 4B. In that case, the LED 330 blinks with a constant period. However, if the function test results has turned out to be bad, the function test system 100 will discontinuously generate the rectangular waveform as shown in FIG. 4A. Then, the LED 330 will alternate a blinking and a pause.

Now, referring to FIGS. 2 through 5B, operations of the present invention will be described in detail hereinbelow. At steps 502 and 504, the servo computer 100 controls the robot system 130 by way of the input/output card prepared therein, to hold up the head disk assembly 310 being transferred on the conveyer belt and read a bar code attached thereon. Here, the bar code attached on the head disk assembly 310 includes a serial number and various identification information of the head disk assembly 310 to be tested. At a step 506, the robot system 130 mounts the head disk assembly 310 on an empty port of the servo writer system 120, under the control of the servo computer 100. Then, at a step 508, the servo computer 100 provides the servo writer system 120 with a command signal via the RS232C card, to begin to write the servo information on the disk. The servo computer 100 checks, at a step 510, whether or not a servo writing completion signal has been received from the servo writer system 120 via the RS232C card. Upon detecting the servo writing completion signal, the servo computer 100 generates a command signal for checking whether or not the servo information is correctly written on the disk. Then, the servo computer 100 checks, at a step 512, whether or not the servo writer system 120 has correctly write the servo information on the disk. If the servo information is not correctly written, the servo computer 100 will execute steps 514 and 516 to generate a re-servo writing command signal to the servo writer system 120 and increase a re-servo writing number by one. However, if the servo information is correctly written at the step 512, the robot system 130 demounts the head disk assembly 310 from the servo writer system 120 and transfers the demounted head disk assembly 310 to the function test system 110 to mount it thereon, under the control of the servo computer 100, at a step 518.

Thereafter, at a step 520, the servo computer 100 generates a function test start command signal to the function test system 110 via the function test card. Upon receiving the function test start command signal, the function test system 110 drives the spindle motor and the actuator based on the servo information written on the disk, in order to perform the functional test and to check again a written status of the servo information. The servo computer 100 checks, at a step 522, whether or not the results of the function test are good. The test results are displayed through the LED 330 mounted on the function test device 300. That is, if the function test results have turned out to be good, the function test device 300 continuously generates the rectangular waveform with the constant period of 500 ms as shown in FIG. 4B. In that case, the LED 330 blinks with a constant period. However, if the function test results have turned out to be bad, the function test device 300 discontinuously generates the rectangular waveform as shown in FIG. 4A. Then, the LED 330 will alternately repeat a blinking and a pause.

If the function test results of the head disk assembly 310 have turned out good at the step 522, the servo computer 100 generates a message indicative of the good test results, at a step 524. At the same time, the robot system 130 demounts the head disk assembly 310 from the function test system 110 to transfer it through the conveyer belt, under the control of the servo computer 100. It is common that the operator puts a good head disk assembly upright, and puts a bad head disk assembly upside down, in order for the next operator to be able to distinguish the bad head disk assembly from the good ones. Meanwhile, if the function test results of the head disk assembly 310 have turned out bad at the step 522, the servo computer 100 generates a re-test command signal to the function test system 110 and increases the re-test number by one, at a step 526. Then, the servo computer 100 checks, at a step 528, whether or not the increased re-test number is over 2. If not, the procedure returns to the step 520 to perform the function test again. However, if the re-test number is over 2, the servo computer 100 generates a message indicative of the bad test results at a step 530, and demounts the head disk assembly from the function test system 100 to transfer it the conveyer belt at a step 532. As usual, the operator may put the bad head disk assembly upside down.

Accordingly, in accordance with the present invention, the robot system 130 can transfer the head disk assembly 310 and monitor the test results of the test process, in response to control signals from the servo computer 100. Thus, it is possible to realize an automation system for manufacturing the hard disk drive.

As described in the foregoing, the automation system of the invention can automatically perform the servo writing process and the function test process at the same time, so that the yield of the head disk assembly in the function test process may be improved.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. An automation system for manufacturing a hard disk drive comprising:

a function test device with a predetermined number of test ports, for performing a function test on a head disk assembly;

a servo writing device for writing servo information on a disk of the head disk assembly;

a control device for providing a peripheral device with a control signal for controlling a manufacturing process of the hard disk drive; and a robot device for mounting and demounting the head disk assembly to said function test device and said servo writing device, under the control of the control device.

2. An automation system according to claim 1, said control device comprising:

a function test interface for interfacing between the control device and the function test device;

an interface for interfacing between the control device and the servo writing device; and an input/output interface for interfacing between the control device and the robot device.

3. An automation system according to claim 1, further comprising a display mounted on said function test device, to display a function test result of the head disk assembly.

4. An automation system according to claim 3, said display being connected to the function test device and varying a blink timing to optically indicate the function test result of the head disk assembly.

5. A method of operating an automation system for manufacturing a hard disk drive, including a control device for providing a control signal to a peripheral device for controlling a manufacturing process of the hard disk drive, a function test device for performing a function test on a head disk assembly, a servo writing device for writing servo information onto a disk of the head disk assembly, and a robot device for mounting and demounting the head disk assembly to said function test device and said servo writing device under the control of the control device the method, comprising:

a first step of mounting the head disk assembly on the servo writing device;

a second step of writing the servo information on the disk of the head disk assembly;

a third step of mounting the head disk assembly on the function test device; and a fourth step of performing the function test on the head disk assembly based on the servo information written on the disk.

6. A method of operating an automation system according to claim 5, further comprising:

a fifth step of checking after the second step whether or not the servo information has been correctly written.

7. A method of operating an automation system according to claim 6, further comprising a sixth step of re-writing the servo information on the disk, if the servo information is determined not to be correctly written in the fifth step.

8. A method of operating an automation system according to claim 5, further comprising a seventh step of generating a message indicative of a good function test result, if the function test result of the fourth step turns out to be good.

9. A method of operating an automation system according to claim 5, further comprising:

an eighth step of re-testing the head disk assembly, if the function test result of the fourth step turns out to be bad; and a ninth step of generating a message indicative of a bad function test result, if the function test result of the eighth step turns out to be bad.

10. A method of operating an automation system for manufacturing a hard disk drive, including a control device for providing a control signal to a peripheral device for controlling a manufacturing process of the hard disk drive, a function test device for performing a function test on a head disk assembly, a servo writing device for writing servo information onto a disk of the head disk assembly, and a robot device for mounting and demounting the head disk assembly to said function test device and said servo writing device under the control of the control device, the method comprising the steps of:

mounting the head disk assembly on the servo writing device with the robot device;

writing servo information on the disk of the head disk assembly with the servo writing device;

determining whether the servo information has been written correctly by the servo writing device;

upon the servo information not been correctly written, increasing a re-servo writing number and again writing servo information on the disk with the servo writing device and again checking to determine if the servo information has been correctly written until such time that the servo information has been correctly written or the re-servo writing number is greater than a predetermined number and if the re-servo writing number is greater than a predetermined writing number, generating a bad test message;

upon determining that the servo information has been correctly written, mounting the head disk assembly on the function test device with the robot device;

performing the function test on the head disk assembly based on the servo information written on the disk;

determining if the function test has a good result and if so, generating a good test message; and upon the function test result not being good, again performing the function test and increasing a function retest number until such time that the function test produces a good result or the retest number is greater than another predetermined number and if the retest number is greater than the another predetermined number, generating a bad test message.

* * * * *